United States Patent [19]

Lehmann et al.

[11] Patent Number: 4,552,416
[45] Date of Patent: Nov. 12, 1985

[54] REARING ARRANGEMENT FOR GUIDING A CARRIAGE IN A STRAIGHT LINE ALONG A GUIDE RAIL

[75] Inventors: Wolfgang Lehmann, Stuttgart; Hans-Walter Aab, Waiblingen, both of Fed. Rep. of Germany

[73] Assignee: Neff Gewindespindeln GmbH, Waldenbuch, Fed. Rep. of Germany

[21] Appl. No.: 594,129

[22] Filed: Mar. 28, 1984

[30] Foreign Application Priority Data

Apr. 12, 1983 [DE] Fed. Rep. of Germany ....... 3313128

[51] Int. Cl.$^4$ .............................................. F16C 29/06
[52] U.S. Cl. .................................................. 308/6 C
[58] Field of Search ................ 308/6 C, 6 R, 3 A, 3.5

[56] References Cited

U.S. PATENT DOCUMENTS

| | | | |
|---|---|---|---|
| 4,363,526 | 12/1982 | Teramachi | 308/6 C |
| 4,420,194 | 12/1983 | Asami | 308/6 C |
| 4,427,240 | 1/1984 | Teramachi | 308/6 C |
| 4,441,765 | 4/1984 | Kasai et al. | 308/6 C |

FOREIGN PATENT DOCUMENTS 2136024 1/1972 Fed. Rep. of Germany .

Primary Examiner—Stuart S. Levy
Assistant Examiner—David Werner
Attorney, Agent, or Firm—Frishauf, Holtz, Goodman & Woodward

[57] ABSTRACT

A bearing arrangement for guiding a carriage in a straight line along a guide rail has four endless courses of balls disposed between the guide rail and the carriage, and the guide rail is provided with four parallel ball races associated with the load-bearing balls of the ball courses. The balls are held in elongated ball bearing assemblies. The ball races are located in the respective transitional zones between two adjacent shanks, located one above the other, of the substantially double-T-shaped or cruciform guide rail.

In order to increase the flexural strength of the guide rail and to provide a manner of securing it in a tilt-free manner, the arrangement is selected such that on at least one side the guide rail has two integral, longitudinal parallel ribs, which define a longitudinal groove in which securing devices for the guide rail and/or for elements insertable into the longitudinal groove are disposed, fitting seats between the ball bearing assemblies and the carriage insure accurate guidance.

17 Claims, 3 Drawing Figures

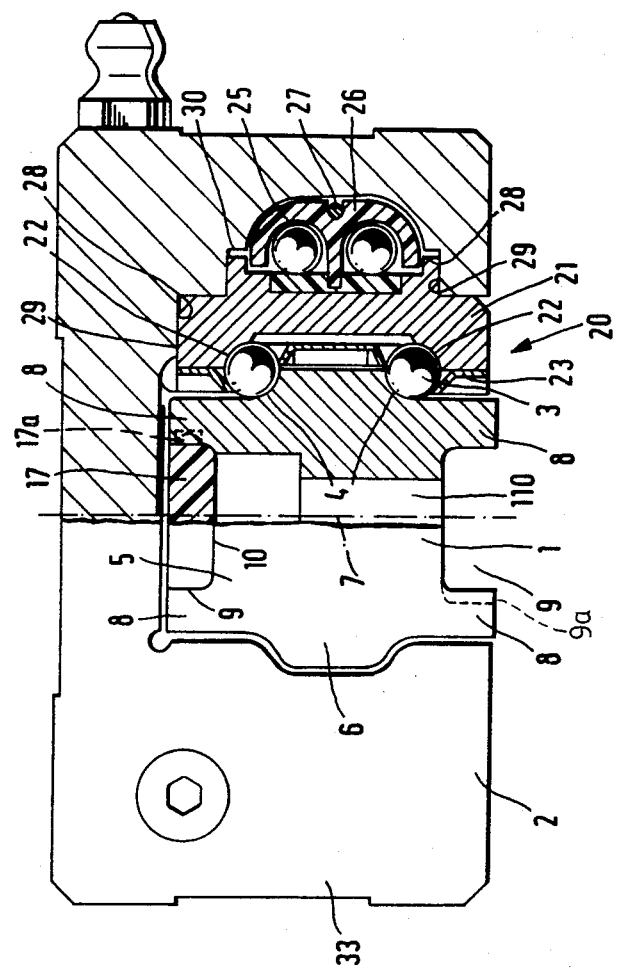
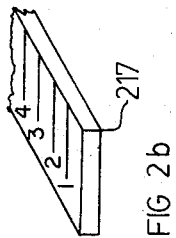
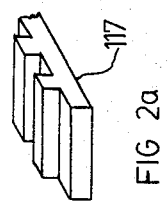
FIG. 2
FIG. 2b
FIG. 2a

BEARING ARRANGEMENT FOR GUIDING A CARRIAGE IN A STRAIGHT LINE ALONG A GUIDE RAIL

Reference to related application assigned to the assignee of the present invention, by the inventors hereof, the disclosure of which is hereby incorporated by reference: U.S. Ser. No. 06/594,207, filed Mar. 28, 1984, LEHMANN and Aab, entitled LINEAR BEARING ARRANGEMENT FOR GUIDING A CARRIAGE IN A STRAIGHT LINE ALONG A GUIDE RAIL.

The invention relates to a bearing arrangement for guiding a carriage in a straight line along a guide rail. The arrangement includes four endless courses of balls disposed between the guide rail and the carriage, and the guide rail has four parallel ball races associated with the loadbearing balls of the ball courses. The ball races of the guide rail are disposed respectively in the transitional zone between two adjacent shanks, located one above the other, of the guide rail, the cross section of which is substantially in the shape of a double T or a cross. At either side of the guide rail, ball races for the load-bearing balls, as well as diversion and return tracks for the unloaded balls, are disposed in the interior of the carriage, which encompasses the guide rail on at least three sides.

BACKGROUND

A bearing arrangement of this kind is known from German Patent Disclosure Document DE-OS 21 36 024. The guide rail, which is substantially double-T-shaped in cross section, has substantially greater dimensions in height than in width, so as to attain increased flexural strength for loads occurring in the primary loading direction. For securing the guide rail on the bearing surface, for instance for a bed of a machine tool, bearing blocks distributed along the guide rail are used, and the guide rail is screwed to them. The guide rail rests on its narrow end on these bearing blocks, or else the bearing blocks have two bead-like reinforcements, between which the guide rail is embedded. In the first type of securing the guide rail to the bearing surfaces, the resistance to tilting is insufficient for applications in which strong lateral forces may be expected; the second type is relatively costly and requires additional space, which may, on occasion, be undesirable.

THE INVENTION

It is accordingly an object of the invention to provide a bearing arrangement for guided, rotationally secured and unlimited linear movement of the carriage, which is equipped for bearing heavy loads, along the guide rail, the bearing arrangement being distinguished by high flexural strength and ease of tilt-free attachment to a base, as well as being adaptable readily to the different conditions existing in various type of applications.

Briefly, the bearing arrangement as generally described above is improved according to the invention in that the guide rail has on at least one side two integral, longitudinal, parallel ribs, defining a longitudinal groove, in which securing devices for the guide rail and/or for elements that may be longitudinally slid into, and thus inserted into the longitudinal groove.

Because the ribs are mounted upon the profile of the guide rail, the flexural strength of the guide rail is increased, without substantially increasing the amount of material required to make it. At the same time, however, the two longitudinal ribs, or the longitudinal groove that extends between them afford the opportunity to effect tilt-free flange and base mounting, without having to use securing elements laterally encompassing the guide rail or having to provide recesses or similar alterations on the guide rail itself.

In a preferred form of embodiment, the guide rail has a longitudinal groove, defined by ribs, on each of two opposing sides. It is also desirable to apply the securing devices in a recess in the bottom of the longitudinal groove and to provide a covering strip to be inserted into the longitudinal groove, so that the longitudinal groove is closed off from the outside. Deposition of soil or chips between the longitudinal ribs, which could impair the proper functioning of the roller bodies traveling on the ball races, is thereby prevented.

The covering strip may be clamped together with the guide rail in a positively engaged manner by means of retaining parts and may otherwise be made of a flexible plastic material.

For a particular intended use, a scale or a rack with teeth, for instance, may be inserted into the longitudinal groove, and the carriage can then be positionable at locations read on the scale. The carriage may be a driving or a driven element selectively positionable on the guide rail.

The securing of the guide rail is advantageously effected in such a manner that it is mounted with its longitudinal groove, with close tolerances, on a rib or projection protruding from a carrier part and then connected to the carrier part by means of the securing devices. The carrier part may either be a machine frame directly or a part of the base; however, the arrangement may also be such that the carrier part is a profiled rail of substantially T-shaped cross section, which is arranged on a bearing surface for securing purposes.

The advantage of securing the apparatus in this manner is that a high degree of freedom from tilting is thereby assured, and the securing screws of the guide rail are protected from any laterally exerted forces. Also, expensive provisions do not need to be made with respect to the bearing or carrier part, because the rib on which the guide rail is mounted is an element that is relatively simple to manufacture.

The shanks of the guide rail may be defined in parallel flanks, and the guide rail itself is advantageously substantially square in cross section. The carriage can then be disposed on the guide rail in different spatial orientations, while on the other hand a substantially uniform load-bearing capacity is attained in any direction for loads engaging the carriage from various directions. With a guide rail of this kind, it is furthermore easy, if required, to use a carriage that encompasses the guide rail all the way around. The four ball races are then disposed in point symmetry on the guide rail with respect to the central longitudinal axis of the guide rail.

In many applications, especially if the bearing arrangement is used to support very heavy or bulky machine elements, problems arise in installing the completely assembled bearing arrangement between the two machine elements that are to be supported one on the other; an example is a machine base and a support. In that case it is desirable to attach the carriage and the guide rail on a machine element and a base, respectively, while the bearing arrangement is still disassembled. The bearing is then assembled in final form when the machine elements to be and the base with the guide rail are positioned correctly relative to one another.

This is easily attainable in the novel bearing arrangement described herein, by forming the carriage of C-shaped cross section with an insertion opening the inside diameter of which is greater than the width of the guide rail. The ball races on the side toward the carriage and also the diversion and return track for the balls are each combined in respective pairs of roller bearing inserts, in the form of subassemblies in which the balls of the two ball courses are retained captive. These roller bearing inserts are so shaped that they can be pushed in from an end face into corresponding recesses of the carriage at either side of the guide rail and then retained in the correct position.

The drawing illustrates various exemplary embodiments of the subject of the invention.

DRAWING

FIG. 2 shows the bearing arrangement of FIG. 1 in the assembled state, seen partially in cross section, and on a different scale;

FIGS. 2a and 2b show different embodiments of insert slips; and

DESCRIPTION OF THE PREFERRED EMBODIMENTS

Figure 1:
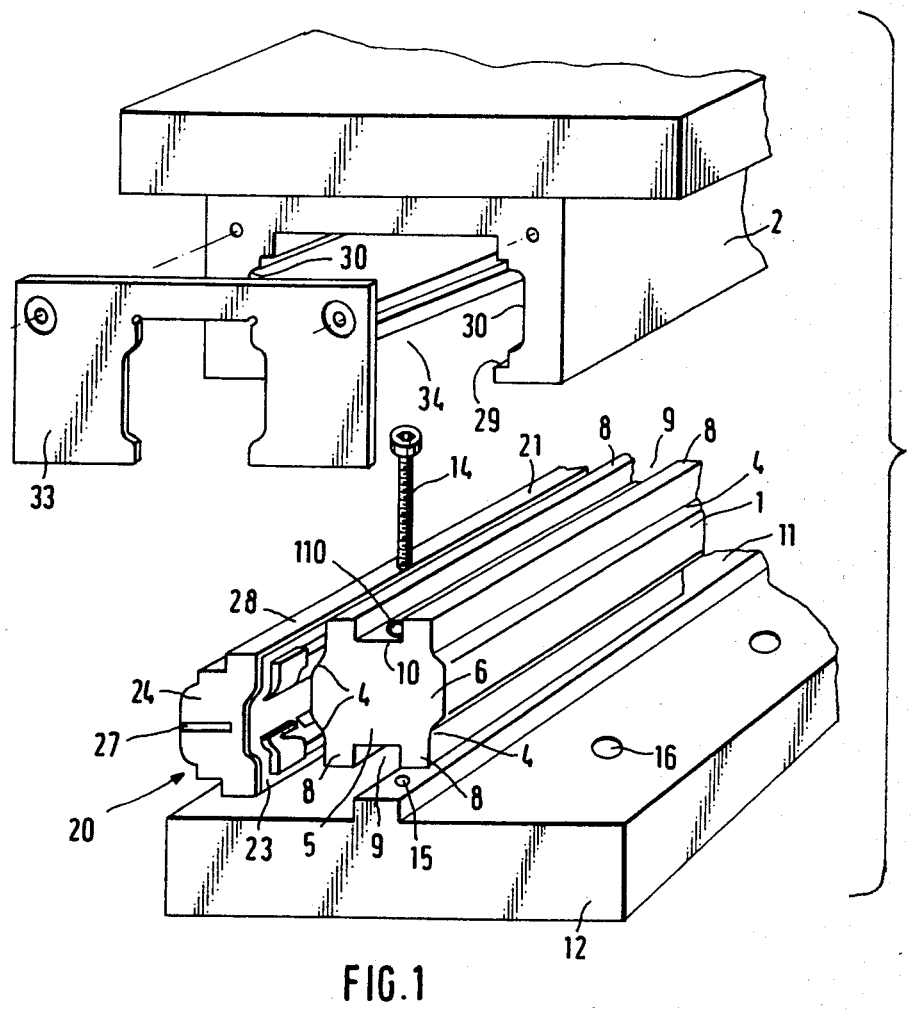
FIG. 1 shows a bearing arrangement according to the invention, in the disassembled state, in a perspective view of its individual parts.

The bearing arrangement has a guide rail 1 of substantially double T-shaped or cruciform cross section and a carriage 2 of substantially C-shaped cross section, encompassing the guide rail 1 on three sides and guided in a straight line thereon. Four endless courses of balls 3 (FIG. 2) are disposed between the guide rail 1 and the carriage 2. The load-bearing balls travel on four associated parallel ball races 4 of the guide rail 1. The machined ball races 4 of the guide rail 1, have profiles closely adapted to the outline of the balls 3. The races 4 are located in the respective transitional zones between two adjacent shanks 5, 6, of the guide rail 1, located one above the other, as may be seen in FIGS. 1, 2. The ball races 4 are disposed point-symmetrically with respect to the central longitudinal axis, indicated at 7, of the guide rail 1; in other words, the center points of the balls 3 traveling on the ball races 4 are located in the corners of an imaginary square. The guide rail 1 itself is substantially square in cross section, and its shanks 5, 6 are defined with parallel flanks.

On the top and bottom of its shanks 5, the guide rail 1 has respectively two parallel longitudinal ribs 8, between which a longitudinal groove 9 of U-shaped cross section and parallel flanks is defined.

Screw holes 110 (FIG. 2) are disposed in a recessed manner in the bottom 10 of the upper longitudinal groove 9, extending as far as the opposite longitudinal groove and being distributed at predetermined intervals over the length of the guide rail 1.

Figure 3:
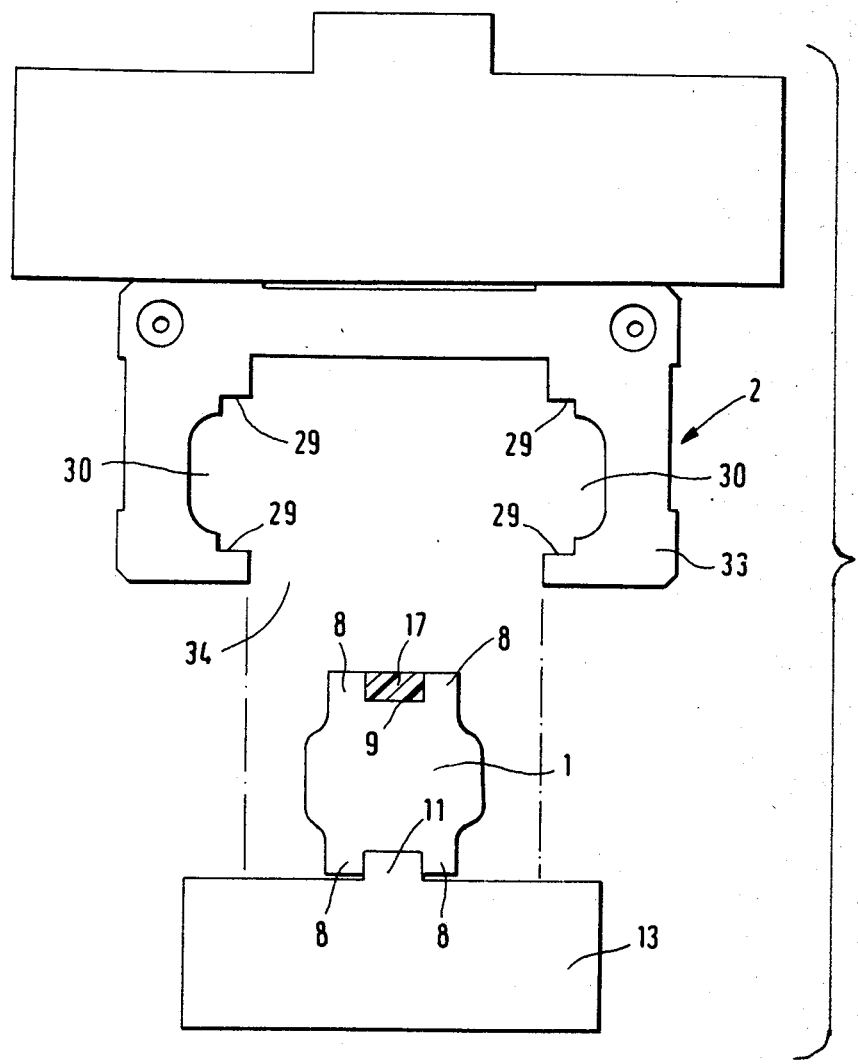
FIG. 3 shows a bearing arrangement according to the invention, showing its association with respect to a machine base.

With its lower longitudinal groove 9, the guide rail 1 can be mounted with close tolerances upon a rib 11 of a profiled rail 12 or directly on a machine base 13 (FIG. 3). The guide rail 1 is screwed together with the rib 11 by means of securing screws 14 inserted into the screw holes 110, the screws 14 engaging corresponding threaded bores 15 of the rib 11 of the profiled rail 12 or machine bed 13, which in turn have corresponding bores 16. The screw bolts 14 are, as noted, countersunk in the bottom 10 of the upper longitudinal groove 9. This longitudinal groove itself is closed by a flexible covering strip 17 (FIG. 2) made of plastic material, so that dirt and the like are prevented from entering it.

Instead of the covering strip 17, a positioning scale 217 (FIG. 2b) or a toothed rack 117 (FIG. 2a) may be inserted in a corresponding manner into the longitudinal groove 9, in order to mention only a few possible examples of elements that can be introduced into the longitudinal groove 9.

In the guide rail 1 shown herein, two longitudinal grooves 9 are provided, one on the top and the other on the bottom of the guide rail 1. Forms of embodiment are also conceivable in which only one guide groove 9 is present, or in which as many as four longitudinal grooves 9 may be provided, the axes of which are located in pairs vertically one above the another. The longitudinal grooves 9 may also be disposed laterally with respect to FIG. 2.

The four endless courses of balls 3 are each retained captive in pairs in two subassemblies embodying two roller bearing inserts 20. Each of these subassemblies has a ledgelike or strip-like track element 21 made of steel, on which two parallel ball races 22 are formed, which in their profile are closely adapted to the outline of the balls 3. The load-bearing balls 3 located on the ball races 22 are retained captive by means of a retaining plate 23 mounted on the track element 21. At both end faces, two diversion elements made of plastic material are connected to the track element 21, and in each diversion element 24 there is one U-shaped diversion track for each ball course, by way of which track the unloaded balls 3 are directed into the return track 25 of a return element 26 disposed on the rear side of the track element 21. The return element 26 is substantially groove-like in embodiment and is made of plastic material. The whole is combined into one subassembly by means of a snap on wire bracket 27.

The roller bearing inserts 20 have parallel guide faces 28 embodied on the track element 21, and corresponding guide faces 29 in an associated recess 30 of the carriage 2 are associated with the guide faces 28. The roller bearing inserts 20 can therefore be pushed into the carriage 2 from the direction of the end face at either side of the guide rail 1 and fixed in a positionally correct location by means of removable lids or end corners 33 mounted on the carriage 2.

The insertion opening 34 (FIG. 1) of the C-shaped carriage 2 is larger in its inside diameter than the width of the rail 1. The roller bearing inserts 20 can be removed by being slid out longitudinally—after removal of lid 33—and the carriage 2, with the machine elements connected to it, can be removed free of the guide rail 1, i.e. lifted off, in the manner shown in FIG. 3. For reassembly, the machine element with the carriage 2 attached, is positioned correctly relative to the guide rail. Then the roller bearing inserts 20 are inserted, at which point the bearing arrangement is capable of functioning. The cover 33 overlaps the opening 34 (see FIG. 1) and has an opening fitting around the rail 1.

Instead of a carriage 2 of C-shaped cross section, a carriage which is closed may also be used—that is, one which encompasses the guide rail 1 on all sides. A carriage of such a kind is then suitable for transmitting torque as well, and the guide rail 1 may then serve as a profiled shaft as well.

We claim:

1. In combination with a base structure (12) including at least one projection,
    bearing arrangement for guiding a carriage (2) in a straight line along a guide rail (1) wherein
    the guide rail (1) is formed with four longitudinal guide tracks (4) thereon;
    the carriage (2) is longitudinally movable with respect to the guide rail;
    an interposed longitudinal ball bearing assembly (20) is provided, interposed between the carriage (2) and the guide rail (1), and supporting the carriage on the guide rail, said ball bearing assembly (20) having a plurality of balls (3) for rolling and weight bearing contact with the guide tracks (4) on the guide rail, said assembly including return track means (24, 25, 26) for returning and recirculating unloaded balls in an endless chain around the guide tracks,
    and wherein
    the guide rail (1) is formed, at the side of the rail remote from the position of the carriage thereon, with at least two longitudinal parallel ribs (8), defining a longitudinal groove (9) therebetween;
    at least one projection (11) of the base structure fitting in the groove (9) between said parallel ribs;
    the carriage (2) has generally C-shaped cross section defining an insertion opening (34), the inside diameter of the insertion opening being larger than the width of the guide rail (1);
    said ball bearing assembly (20) forming a unitary element including said balls (3), said return track means (24, 25, 26) and ball retention means (23) for retaining the balls on said assembly and retaining said ball captive thereon, comprising a ball race body (21) having ball races (22) thereon, located for operation of the balls between guide tracks (24) on the rail and the ball race 5(22) on said ball race body, said ball race body further having said return track means (24, 25, 26) secured to said ball race body (21) and forming part of said unitary element, said ball retention means being secured to said ball race body and forming part of said unitary element, to retain the balls in and on the respective ball races and in and on said unitary element;
    said carriage being formed with receiving recesses (30) at either side of the guide rail to receive said ball bearing assembly (20) as a unitary element (20) including said ball race body, and said return track means (24, 25, 26);
    and matching, engaging, fitting surfaces (28, 29) formed respectively, in said opening (34) of said carriage (2) and the ball race body (21) for positioning of the ball race body, and hence the ball bearing assembly (20) in the carriage upon insertion of the bearing assembly (20) into the carriage and thereby recisely locating the balls (3) between the guide tracks (4) on the rail, and the ball races (22) on the ball race body of the bearing assembly (20).

2. Bearing arrangement according to claim 1, wherein two ribs (8) are provided, defining one groove (9) therebetween;
and the projection (11) comprises an elongated rib fitting into said groove (9).

3. Bearing arrangement according to claim 1, including an upper elongated groove formed in said guide rail (1) at a side thereof close to the position of the carriage (2);
    and attachment means (110, 14) positioned in said elongated groove for attaching the guide rail (1) to said base structure (12).

4. Bearing arrangement according to claim 3, further including a cover strip (17) located in said elongated groove and essentially filling said elongated groove and covering said attachment means.

5. Bearing arrangement according to claim 4, including interengaging, interfitting means (17a) formed, respectively, on said cover strip and in a surface of said rail adjacent said elongated groove to retain said cover strip in said elongated groove.

6. Bearing arrangement according to claim 4, wherein said cover strip is made of flexible plastic material.

7. Bearing arrangement according to claim 3, further including a positioning scale (217) fitted into said elongated groove.

8. Bearing arrangement according to claim 3, further including a toothed rack (117) fitted into said elongated groove.

9. Bearing arrangement according to claim 1, wherein said base structure (12) comprises a profile rail of—in cross section—essentially T-shape;
    and means (14, 11, 15) for clamping said rail (1) to the base, with the center leg of the T-shaped base forming said projection fitting into the groove (9) of the rail.

10. Bearing arrangement according to claim 1, wherein the lateral side surfaces (5, 6) of the rail, adjacent the parallel rail races (4), are formed by parallel flanking faces.

11. Bearing arrangement according to claim 8, wherein the guide rail comprises a—in cross section—essentially square structure with said longitudinal groove (9), said elongated groove and said four parallel guide rail races (4), formed therein.

12. Bearing arrangement according to claim 1, wherein the four parallel guide rail races (4) are located on the guide rail (1) point-symmetrically with respect to the longitudinal central axis (7) of the guide rail (1).

13. Bearing arrangement according to claim 1, wherein said carriage has open ends;
    and further including end covers or lids (33) closing off said open ends and retaining said ball bearing assemblies in position within the carriage.

14. Bearing arrangement according to claim 13, wherein the end cover or lid (33) overlaps the insertion opening and fits, essentially, around the rail (1).

15. Bearing arrangement according to claim 13, wherein said lid is removably secured to the carriage.

16. Bearing arrangement according to claim 5, wherein the covering strip is made of a flexible plastic material.

17. Bearing arrangement according to claim 14, wherein said lid is removably secured to the carriage.

* * * * *